(12) United States Patent
Mansuino

(10) Patent No.: US 7,404,978 B2
(45) Date of Patent: Jul. 29, 2008

(54) WAFER HALF-SHELL, A METHOD FOR ITS PREPARATION, AND A FOOD PRODUCT INCLUDING IT

(75) Inventor: Sergio Mansuino, Mondovi' (IT)

(73) Assignee: Soremartec S.A., Schoppach-Arlon (BE)

( * ) Notice: Subject to any disclaimer, the term of this patent is extended or adjusted under 35 U.S.C. 154(b) by 468 days.

(21) Appl. No.: 10/742,910

(22) Filed: Dec. 23, 2003

(65) Prior Publication Data

US 2004/0137123 A1   Jul. 15, 2004

(30) Foreign Application Priority Data

Dec. 23, 2002   (EP)   .................... 02425792

(51) Int. Cl.
*A23G 1/21*   (2006.01)
*A23G 3/00*   (2006.01)

(52) U.S. Cl. .................... 426/94; 426/138; 426/283

(58) Field of Classification Search .................... 426/94, 426/95, 138, 283, 391, 139
See application file for complete search history.

(56) References Cited

U.S. PATENT DOCUMENTS

| | | | | |
|---|---|---|---|---|
| 1,615,680 A | * | 1/1927 | Buhse | .................... 426/139 |
| 2,069,027 A | * | 1/1937 | Balton | .................... 426/391 |
| 2,404,177 A | * | 7/1946 | Jetschmann | .................... 426/95 |
| 4,430,351 A | | 2/1984 | Cillario | |
| 5,635,230 A | * | 6/1997 | Aasted | .................... 426/138 |
| 5,792,496 A | * | 8/1998 | Fekete et al. | .................... 426/104 |

FOREIGN PATENT DOCUMENTS

| | | |
|---|---|---|
| EP | 0 054 229 A2 | 6/1982 |
| EP | 0 086 319 A2 | 8/1983 |
| EP | 0 086 319 A3 | 8/1983 |
| EP | 0 221 033 A2 | 5/1987 |
| EP | 0 614 614 A1 | 9/1994 |
| EP | 1 040 763 A1 | 10/2000 |
| EP | 1 110 459 A1 | 6/2001 |
| EP | 1 258 194 A1 | 11/2002 |
| WO | WO 97/48282 A1 | 12/1997 |

* cited by examiner

*Primary Examiner*—Reginald L Alexander
(74) *Attorney, Agent, or Firm*—Rothwell Figg, Ernst & Manbeck, P.C.

(57) ABSTRACT

A wafer half-shell is described which has a mouth delimited by at least one annular surface and one or more side walls, in which the mouth surface and the surfaces of the side wall have a substantially smooth surface finish. Preferably the outer surface of the side wall has a porous, continuous or discontinuous region which extends peripherally and is receded relative to the mouth surface of the half-shell, resulting from the cutting of a radial wall connected to the side wall of the half-shell in a receded position relative to the annular surface defining the mouth of the half-shell. The annular coupling surfaces of the complementary half-shells have preferably centering means which are complementary each other. The half-shell is useful particularly for the production of a food product comprising a pair of half-shells fitted together mouth to mouth and including a mass of liquid filling.

9 Claims, 4 Drawing Sheets

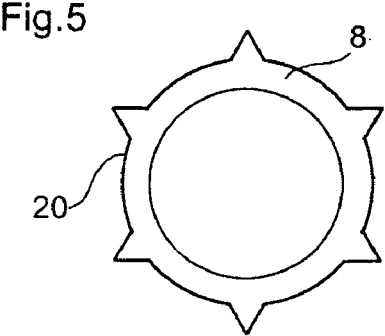
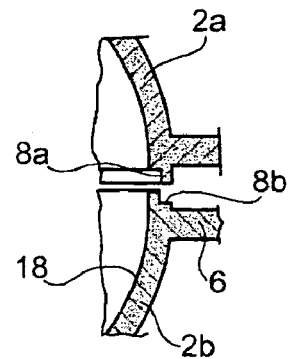
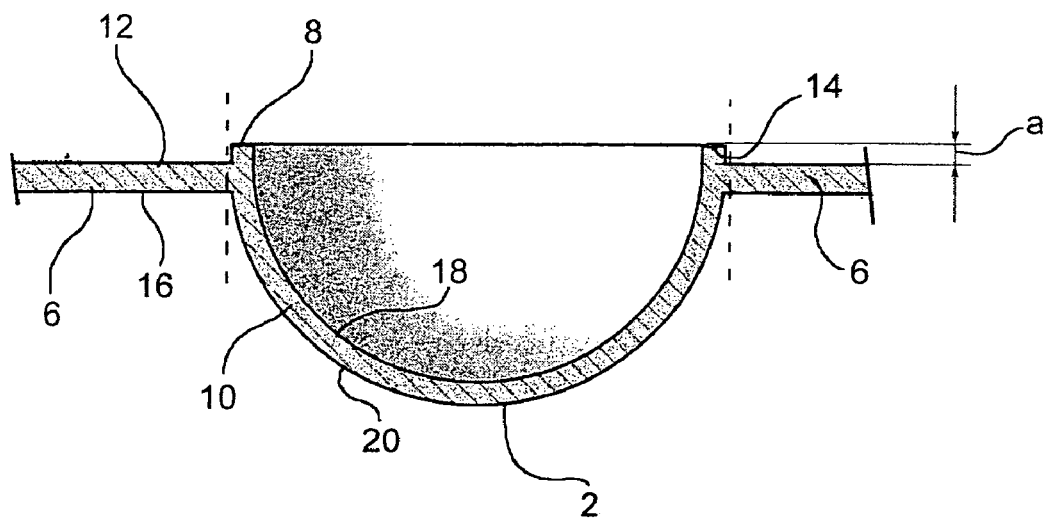
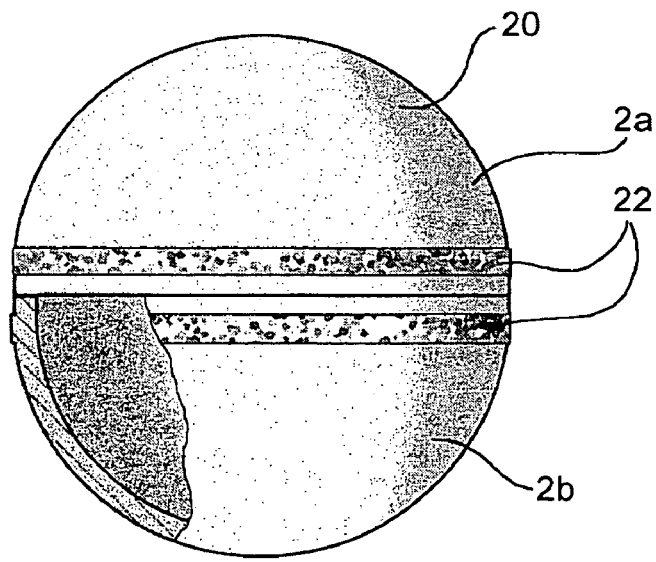

WAFER HALF-SHELL, A METHOD FOR ITS PREPARATION, AND A FOOD PRODUCT INCLUDING IT

The present invention relates to the production of a wafer half-shell of the type usually used in filled food products, comprising a filling contained in the half-shell or, more particularly, enclosed in a shell formed by two half-shells fitted together mouth to mouth.

Food products of the type mentioned above are widely known particularly in the field of confectionery and pastries; the shell may have various dimensions according to the product and various shapes, for example, spherical shapes, egg-shapes, bar-shapes, double truncated-pyramid shapes, or shapes with a plurality of cells.

As described in EP-A-0 054 229 and WO97/48282, a known method for the industrial preparation of the half-shells comprises the preparation of a wafer having a plurality of half-shells interconnected by a continuous, normally flat wall. The intermediate wafer is produced by baking of the wafer batter in a mould comprising a female half-mould constituted by a multi-recessed plate having rows and ranks of recesses that are normally identical to one another and of a shape complementary to that of the half-shells, and a male half-mould which defines with the other half-mould a cavity of a shape corresponding to the intermediate wafer.

In the intermediate wafer thus obtained, all of the half-shells are in relief on one side of the wafer and the interconnecting wall extends flush with the plane constituting the mouths of the half-shells. The intermediate wafer has a porous or cellular internal structure typical of wafers and an upper and a lower surface having a substantially smooth finish substantially free of large surface pores, resulting from the baking of the wafer mix in contact with the polished surfaces of the half-moulds.

According to a first known technique, the half-shells are separated from the interconnecting wall by punching performed through the wall, along the entire perimeter of the mouth of each of the half-shells, with the use of a plurality of steel punches of a size and shape corresponding to those of the mouths of the half-shells.

If the half-shells have straight mouth edges, the separation can also be achieved by a sawing operation in which the saw extends perpendicularly relative to the plane of the wafer.

When the separation of the shells is performed by punching or sawing, a rough and crumbled annular separation region in which the porous internal structure of the wafer is exposed to the exterior is visible on each half-shell thus cut-around the entire annular surface defining the mouth of the half-shell.

In general, it is difficult to perform the punching or the sawing perfectly "in register" with the outline of the mouth of the half-shell, that is, perfectly flush with the outer surface of the side wall of the half-shell, with the consequence that a step formed by a radial flange may appear around the mouth of the half shell.

Even if the punching or sawing operations can be performed perfectly in register, which is desirable per se, because of the fragility of the wafer structure, there is a high risk of the break in the interconnecting wall being propagated in the flat annular surface defining the mouth of the half-shell. In this case, damage or partial removal of the smooth surface finish of this surface occurs and the porous internal structure of the wafer is exposed thereon.

The above-mentioned damage to the annular surface of the mouth of the half-shell has been found to be the source of problems particularly when the half-shells thus produced are used for the production of a filled product formed by fitting two half-shells together mouth to mouth and including a filling of liquid, creamy or paste-like consistency.

In this case, the absence of a good surface finish of the mouth surfaces that are fitted together and the presence of open pores facilitates the migration of the filling into the external wafer structure, causing undesired effects on the internal portion of the wrapping.

According to another known technique described, for example, in EP-A-0 054 229 and EP-A-0 221 033, the cutting of the wafer-half-shells from the above-described intermediate wafer is performed in a plane parallel to the interconnecting wall. In this case, although the cutting process is advantageous in terms of investment costs for the cutting machines in comparison with the much more complex punching operation performed perpendicular to the plane of the interconnecting wall, in the half-shells thus obtained, the surface resulting from the cutting is situated within the thickness of the wall of the half-shell, that is, it is an end face rather than a side face so that the annular mouth surface is without any surface finishing and has a rough and porous structure.

An object of the present invention is to provide a novel half-wafer structure suitable for overcoming the problems mentioned above.

A further object of the invention is to provide a food product comprising two half-shells coupled together along annular mating surfaces, which are shaped so as to facilitate the keeping of the half-shells in a mating relationship, "in register" one with the other, even when the food product contains fluid filling masses, particularly masses having a liquid or creamy consistency.

For these purposes, a subject of the invention is a wafer-half-shell and a method for its preparation as defined in the appended claims.

A further subject of the invention is a wafer useful as an intermediate product for the preparation of the half-shells as well as a food product, particularly a confectionery or pastry product comprising at least one half-shell and preferably two half-shells fitted together mouth to mouth, including a filling, as defined in the appended claims.

The degree of smooth finishing of the annular mouth surface and the fact that it is coplanar with or complementary to any corresponding annular surface coupled therewith prevent leakage of the filling from the wafer.

Further characteristics and advantages of the invention will become clear from the following detailed description, given with reference to the appended drawings which are provided by way of non-limiting example, and in which:

FIG. 2 is a section taken on the line II-II of FIG. 1,

FIG. 3 is a partially-sectioned view of a food product formed by a pair of half-shells of FIG. 2, FIG. 4 is a section through a pair of half-shells but with an L-shaped edge profile, FIG. 5 is a view from above of a wafer half-shell having a circular annular mouth surface with radial projections, FIGS. 6-9 are partially sectioned views, showing products according to the invention, and FIGS. 10-13 are cross-sectional views, showing a couple of wafer sheets with interconnected half-shells from which the products shown respectively in FIGS. 6-9 can be obtained.

Figure 1:
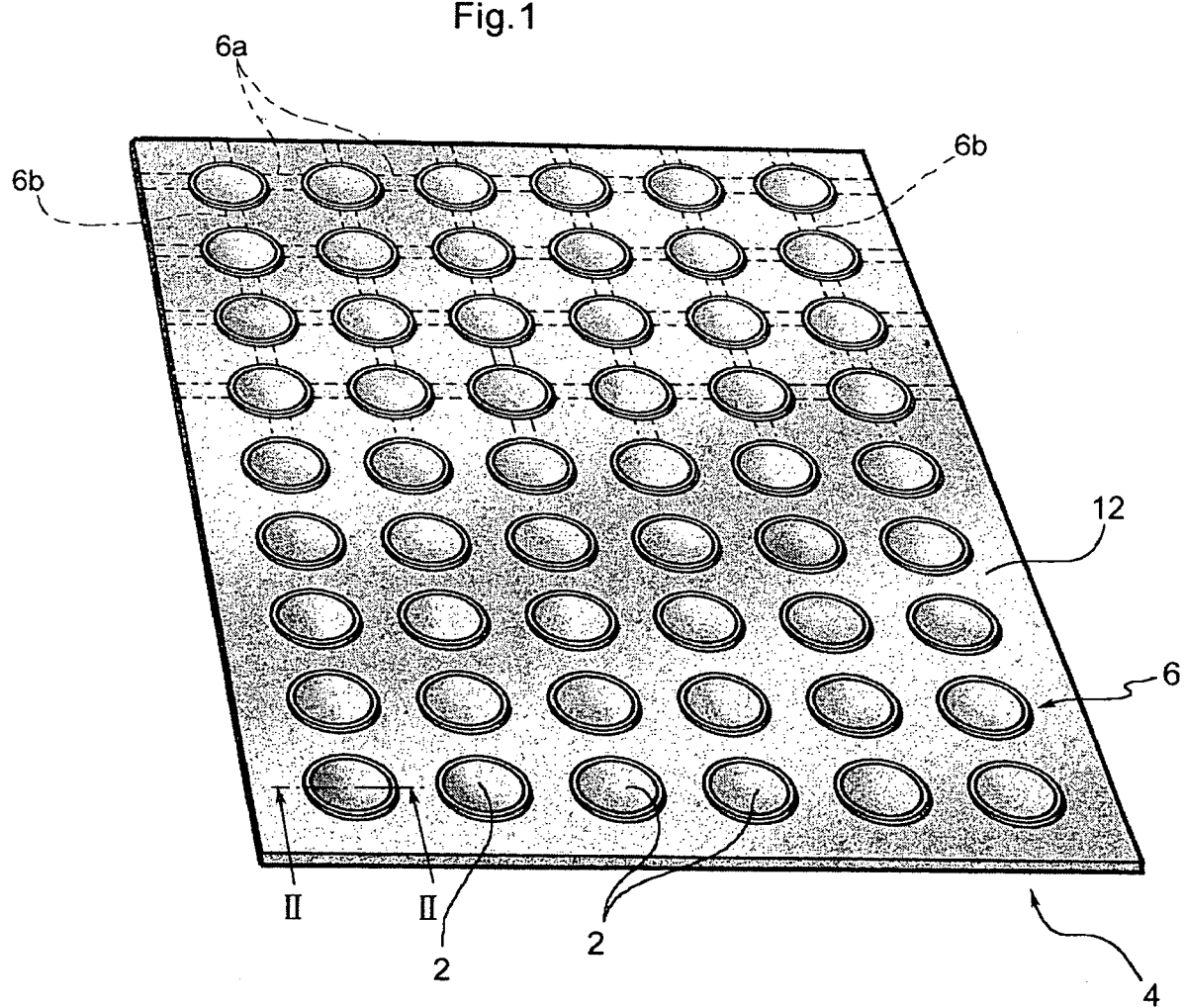
FIG. 1 is a perspective view of a wafer with cells according to the invention.

According to the invention, a wafer half-shell 2 is produced by separation from a wafer 4 having, for example, the characteristics shown in FIG. 1. The wafer comprises a plurality of half-shells 2 arranged in rows and ranks and interconnected by a continuous, substantially flat connecting wall 6 which surrounds the half-shells.

In another embodiment, shown in broken outline in FIG. 1, the half-shells 2 are interconnected by a plurality of interconnecting walls 6a, 6b which are produced by channels or projections of the forming mould.

Each half-shell 2 has an open upper mouth delimited by an annular surface 8 for coupling with a complementary half-shell and a side wall 10 defining the body of the half-shell.

According to a preferred feature of the invention, the interconnecting wall(s) 6, 6a, 6b is (are) connected to the half-shells in a receded position relative to the annular surface 8 defining the mouth.

In one embodiment of the invention, in the wafer 4, the upper surface 12 of the interconnecting wall 6 is receded relative to the general plane of the annular mouth surface 8 so that—adjacent the mouth—an annular collar 14 is defined.

The distance between the plane of the annular coupling surface 8 and the upper surface 12 of the walls 6, 6a, 6b may vary within wide limits in dependence on the size and shape of the half-shell 2.

The wafer 4 may be produced, for example, by the method of forming and baking in a mould as described in WO97/48282. As described in the document cited, to facilitate the removal of the wafer 4 from the mould, the thickness of the interconnecting wall 6, which is, for example, of the order of about 2-2.5 mm, is preferably greater than the wall thickness 10 of the half-shell which may be, for example, of the order of 1-1.5 mm.

However, in the method of the present invention, a situation is naturally also envisaged in which the thickness of the wall 6 is equal to that of the wall 10 of the half-shell 2, or possibly less, particularly when it is desirable to reduce the depth of the separation surface to the minimum.

The wafer 4 produced as a result of baking in the mould has an upper surface 12 and a lower surface 16 of the interconnecting wall/s 6 as well as an upper surface 18 and a lower surface 20 of the half-shells 2, which have a good level of surface finishing, that is, a smooth or polished surface somewhat similar to an outer skin or thin surface crust substantially free of large open pores, although the possible presence of local surface defects cannot be completely excluded. The above-mentioned definition of "smooth surface" is not intended to exclude the possibility that the surface may have a relief or recessed pattern, or that it may be an embossed surface.

Similarly, the annular coupling mouth surface 8 and the annular collar surface 14 have the same surface finish; the internal structure of the wafer 4, on the other hand, is a porous, cellular structure.

The half-shells 2 are obtained from the wafer 4 by means of a cutting operation through the wall 6 around the entire perimeter of the mouth in a manner such that the cutting operation does not interfere with the annular surface of the collar 14. This operation is typically performed by punching with the use of a set of punches of a size and shape corresponding to those of the mouths of the half-shells 2.

As a result of the separation operation, the half-shells thus obtained have, on their side wall or walls—adjacent the mouth but in a position below the general plane of the annular mouth surface 8—a peripheral cutting region 22 with a rough surface, possibly partially crumbled and with open pores, whereas the annular surfaces of the collar 14 and of the mouth 8 retain the high level of surface finishing which characterizes the entire surface of the wafer 4.

If the half-shells are connected by a single wall or web 6, this peripheral cutting region will be constituted by a continuous annular stripe whereas, with interconnecting walls 6a, 6b, the cutting region will be a discontinuous stripe.

Depending on the cutting and detachment method, the surface of the cutting region may be slightly in relief relative to the surface of the wall 10 or even slightly recessed. It is intended that the height of the cutting region 22 can be restricted by reducing the thickness of the interconnecting wall 6 within the limits permitted with regard to the structural strength of the intermediate wafer 4.

When the two half-shells 2a and 2b are fitted together mouth to mouth to form a shell of the type shown in FIG. 3, the annular coupling surfaces 8 that are fitted together are thus free of surface defects or large pores which—as mentioned—may cause deterioration of the food product.

Although the invention has been described herein with reference to the production of a hemispherical half-shell, the invention is intended to be applicable to the production of half-shells of any shape or size.

Naturally, the term "annular surface" relating to the surface of the mouth of the half-shell is intended to indicate a surface that is closed onto itself and does not exclude non-circular annular surfaces, for example, polygonal surfaces or circular surfaces with star-like radial protrusions (FIG. 5). The surface defining the mouth will preferably comprise at least one annular surface which extends in a (horizontal) plane; however, non-planar coupling mouth surfaces with profiles in the shape of a Greek key pattern, toothed, or L-shaped surfaces, for example, with mating surfaces 8a, 8b (FIG. 4) may also be envisaged.

The filled food product as before described is not intended to be limited to products formed by two half-shells fitted together mouth to mouth as shown in FIG. 3, but may include products including a single wafer half-shell coupled mouth to mouth with a half-shell made of another food product such as, for example, a molded chocolate shell, or a single wafer half-shell the base of which is closed by a flat base of wafer or another food substance.

According to another aspect of the invention, the wafer half-shells have coupling annular mouth surfaces provided with centering means which are complementary to centering means provided in the coupling annular surface of a complementary half-shells.

Accordingly, a further subject of the invention is a food product comprising two half-shells, coupled one to the other along annular coupling or mating surfaces defining their mouth profile, wherein the annular mating surfaces of said half-shells have centering means complementary with each other.

The latter embodiment of the invention is shown by way of example in FIGS. 6-9 and 10-13.

According to the latter embodiment, said coupling surfaces do not lie in a single plane, but are shaped so as to have centering means suitable to achieve the coupling "in register" between the two half-shells. The term "in register" is herein used in order to indicate that the coupling surface mate with each other along their whole surface or substantially whole surface.

Said centering means may be obtained by means of coupling surfaces having (in a section orthogonal to the general plane of the mouth, as shown in the drawings) a toothed, a zigzag shaped, a L-shaped, a V-shaped profile or a Greek-key pattern profile or also a slanted profile with respect to the vertical direction.

Figure 10:
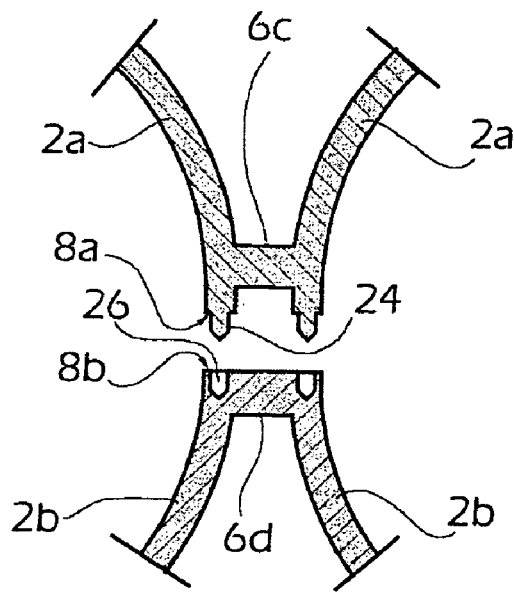
Figure 11:
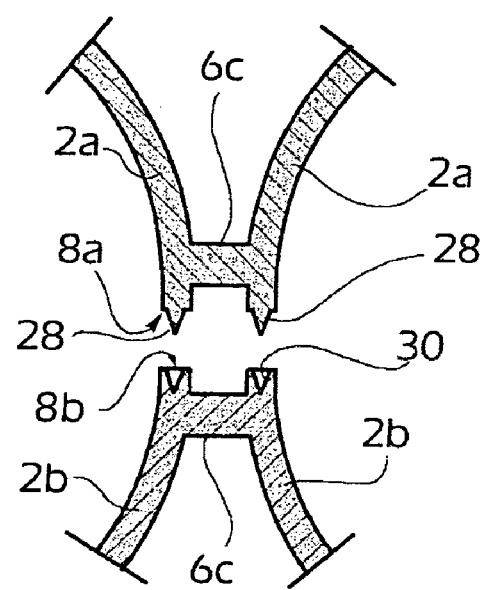

By way of example, in FIGS. 10 and 11, the centering means comprise protruding formations which are toothshaped (or U-shaped) 24 or V-shaped 28 in the coupling surface 8a of the half-shell 2a, which are adapted to engage complementary cavities 26 and, respectively, 30 in the annular coupling surface 8b of the other half-shell 2b.

In the already mentioned example of FIG. 4, said centering means have a step-like or L-shaped profile.

Figure 12:
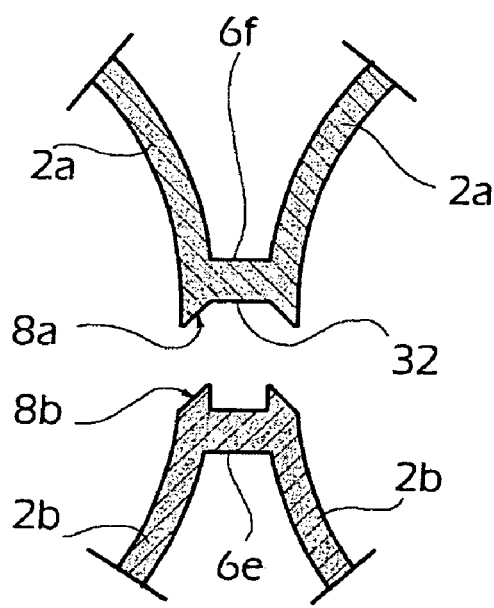
Figure 13:
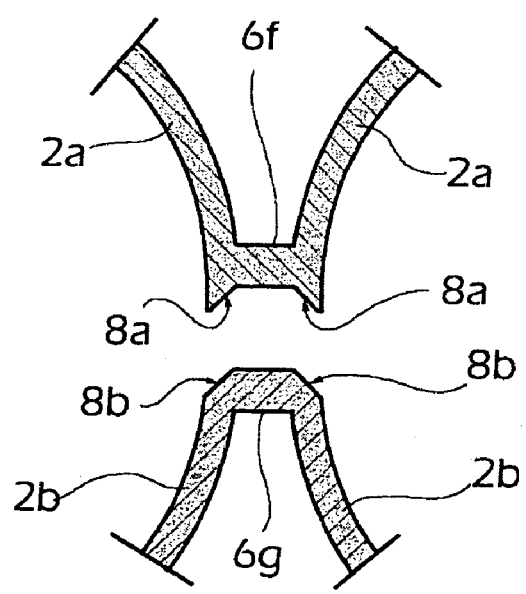

In another embodiment shown in FIGS. 12 and 13, the centering means are defined by the coupling surfaces 8a, 8b themselves, which have a slanted profile, so that the coupling surfaces are tapered; by way of example, they are frusto-conical or frusto-pyramidal surfaces, according to the mouth profile which is adopted for the half-shells.

The coupling surfaces and the surface of the centering means associated therewith are characterized by the same smooth surface finish which has been described hereinbefore.

However, in the presence of said coupling means, there is no requirement—according to the invention—that the interconnecting wall 6 of the wafer sheet from which the half-shells are obtained be connected in a receded position relative to the annular coupling surfaces 8a, 8b, although the latter still constitutes a preferred solution.

Therefore, according to the preferred embodiment, the half-shells with centering means are obtained from wafer sheets with interconnected half-shells, wherein the interconnecting wall is connected to the half-shells in a receded position with respect to the coupling surfaces 8a, 8b. Such a receded interconnecting wall is shown with reference numeral 6c in FIGS. 10 and 11.

When the interconnecting wall 6c is receded or staggered with respect to the annular coupling surfaces, following the cutting operation for separating the half-shells from the interconnecting wall, the thus obtained half-shells show on their sidewall(s) a continuous or discontinuous peripheral cutting region 22 with a rough surface, possibly partially crumbled and/or with open pores, extending in a receded position with respect to the mating surfaces.

Figure 7:
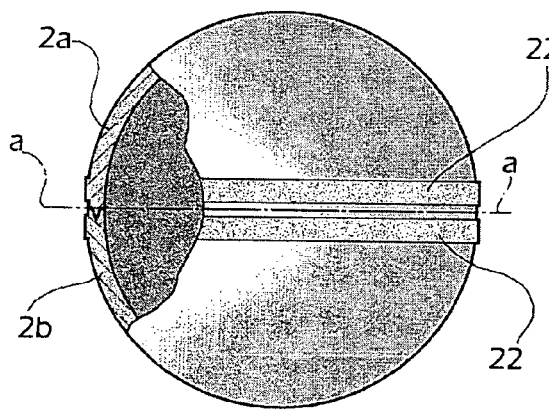

FIG. 7 shows said cutting region 22 resulting from the separation of the half-shells of FIG. 11.

However, when centering means are present, as mentioned before, it is not to be excluded the case where the interconnecting wall between the half-shells has an upper surface (directed towards the mouth side of the shell) lying flush or coplanar with a portion of the coupling surfaces, such as shown for instance by interconnecting wall 6d in FIG. 10.

Figure 6:
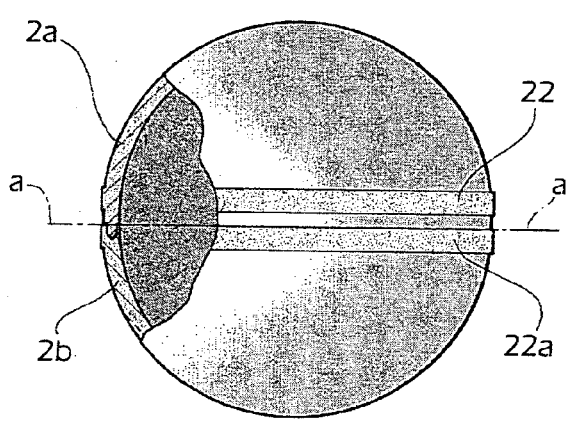

FIG. 6 shows the product obtained from the interconnected half-shells of FIG. 10, with indication of the cutting region 22a obtained by cutting interconnecting wall 6d which is coplanar with a contiguous portion of the coupling surface 8b.

Figure 8:
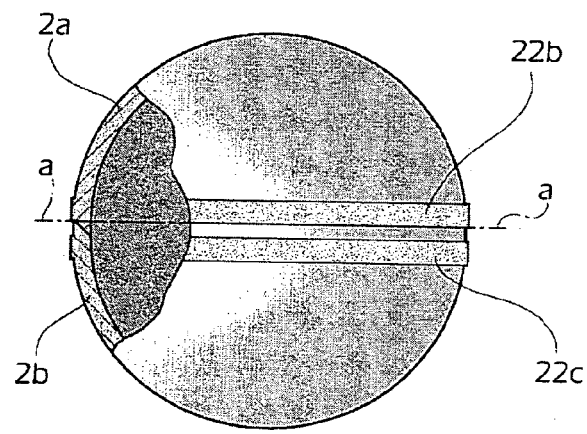
Figure 9:
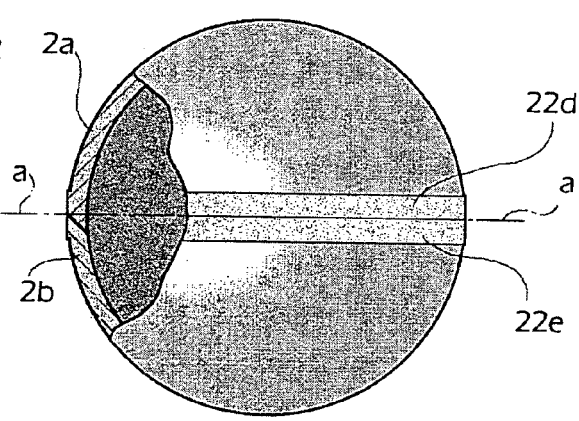

In the same way, FIGS. 8 and 9 show the product obtained from the interconnected half-shells, respectively, of FIGS. 12 and 13, wherein the resulting cutting regions 22b, 22c, 22d and 22e are shown.

In the example of FIG. 12, the interconnecting wall 6e between the half-shells 2b is receded with respect to the extreme end of the coupling surface 8b, whereby the corresponding cutting region 22c (FIG. 8) does not interfere with the coupling surfaces 8b. Also in FIG. 12, the interconnecting wall 6f between half-shells 2a has a surface 32, which is contiguous or directly connected to the annular coupling surfaces 8a.

A similar situation is shown in FIG. 13, where the interconnecting walls between the half-shells are shown with reference numeral 6f and 6g. The product obtained from the half-shell of FIG. 13 is shown in FIG. 9.

What is claimed is:

1. A food product, comprising a pair of half-shells, fitted together mouth to mouth and including a mass of filling, wherein at least one of the half-shells is a wafer half-shell having a mouth delimited by at least one annular surface and one or more side walls, in which the mouth annular surface and the surfaces of the side wall have a substantially smooth surface finish, wherein the outer surface of the side wall has a rough, continuous or discontinuous region which extends peripherally and is receded relative to the mouth annular surface of the half-shell.

2. A food product according to claim 1, further comprising a mass of filling contained in the pair of half-shells.

3. A food product according to claim 1, wherein the rough region is the surface resulting from the cutting of one or more radial walls connected to the side wall of the half-shell in a receded position relative to the annular surface defining the mouth of the half-shell.

4. A food product comprising at least two wafer half-shells coupled one to the other along annular mating surfaces defining their mouth profile, wherein said annular mating surfaces of each of said half-shells have centering means complementary one to the other and wherein at least one of said half-shells has an outer side wall with a rough, continuous or discontinuous region extending peripherally, which is receded relative to the mating annular surface of said half-shell.

5. A food product according to claim 4, wherein said centering means comprise formations susceptible of mutual engagement.

6. A food product according to claim 4, wherein said centering means comprise annular mating surfaces having a toothed profile, a U-shaped profile, a V-shaped profile, a L-shaped profile, a Greek-key pattern profile or a zigzag profile.

7. A food product according to claim 4, wherein said centering means comprise tapered annular mating surfaces.

8. A food product according to claim 4, wherein said annular mating surfaces and the surface of said centering means have a smooth surface finish.

9. A food product according to claim 4, wherein the rough region is the surface resulting from the cutting of one or more radial walls connected to the side wall of the half-shell in a receded position relative to the annular surface defining the mouth of the half-shell.

* * * * *